United States Patent [19]

Sato et al.

[11] Patent Number: 5,127,683

[45] Date of Patent: Jul. 7, 1992

[54] PANEL DETACHING APPARATUS FOR CAR-MOUNTED AUDIO EQUIPMENT

[75] Inventors: Yutaka Sato; Hideshi Nagaya, both of Saitama, Japan

[73] Assignee: Pioneer Electronic Corporation, Tokyo, Japan

[21] Appl. No.: 708,338

[22] Filed: May 31, 1991

[30] Foreign Application Priority Data

Jun. 5, 1990 [JP] Japan .................................. 2-145437

[51] Int. Cl.$^5$ ............................................. E05C 17/32
[52] U.S. Cl. ............................ 292/113; 292/DIG. 72; 292/263
[58] Field of Search ............... 292/113, 110, 109, 196, 292/263, DIG. 72

[56] References Cited

U.S. PATENT DOCUMENTS

| | | | |
|---|---|---|---|
| 1,298,272 | 3/1919 | Anderson | 292/113 |
| 1,883,027 | 10/1932 | Smith | 292/DIG. 72 X |
| 4,391,463 | 7/1983 | Costa Basart | 292/263 |
| 4,534,587 | 8/1985 | Fleming | 292/263 |
| 4,923,232 | 5/1990 | Kawagoe et al. | 292/263 |

Primary Examiner—Richard E. Moore
Attorney, Agent, or Firm—Sughrue, Mion, Zinn Macpeak & Seas

[57] ABSTRACT

One side of the operation panel for audio equipment is supported by a projected strip of the audio equipment body and the other side is held by an engagement claw. The engagement claw is pivotally supported on a holder with a spring installed therebetween. The holder in turn is pivotally supported by the end of a first arm whose base end is rotatably mounted on the audio equipment body. The holder is also pivotally connected to a second arm, which is rotatably mounted on the audio equipment body. When the operation panel is moved between the installed position and the pop-up position, a change in the angle between the holder and the engagement claw is kept small by the action of the second arm, so that the spring force acting on the engagement claw does not increase greatly, permitting easy removal or installation of the operation panel.

2 Claims, 5 Drawing Sheets

PANEL DETACHING APPARATUS FOR CAR-MOUNTED AUDIO EQUIPMENT

BACKGROUND OF THE INVENTION

1. Field of the Invention

The present invention relates to a panel detaching apparatus for car-mounted audio equipment which allows an operation panel for audio equipment to be dismounted from the body of the audio equipment installed in an automobile, such as CD player, cassette tape player or tuner, when a driver leaves his or her car, so that the audio equipment, if it should be stolen, cannot be used without the operation panel, thereby discouraging a possible theft.

2. Description of the Prior Art

A conventional panel detaching apparatus for audio equipment of this kind is shown in FIG. 10.

In the figure, reference symbol A indicates an audio equipment body, and B an operation panel removably installed in the audio equipment body A which has operation buttons for activating reproduction means such as CD player, cassette tape player and tuner.

The operation panel B has an engagement recess 1 at one side which engages with a projected strip 3 formed on one side of a panel-accommodating hollow portion in the audio equipment body A. The operation panel B also has an engagement recess 4 on the other side.

In the hollow portion 2 is provided a stationary shaft 5 on which an arm 6 is rotatably mounted. The shaft 5 has a torsion spring 7 mounted thereon to urge the front end of the arm 6 downwardly.

The arm 6 is provided with a shaft 8, on which is rotatably mounted a claw piece 9 whose front end, a claw portion 9a, is engaged in the engagement recess 4. The shaft 8 is also fitted with a torsion spring 10 that urges the claw portion 9a toward the engagement recess 4.

The operation panel B is installed as follows. With the engagement recess 4 of the operation panel B engaged with the claw portion 9a of the claw piece 9, as shown in FIG. 10, the operation panel B is pushed in the direction of arrow X against the force of the torsion spring 10 to connect the engagement recess 1 with the projected strip 3. Then the operation panel B is pushed toward the player body A, bringing the arm 6 into engagement with a stopper not shown.

Then the operation panel B is blocked from moving in the direction of arrow X by one side wall 2a of the hollow portion 2, thus rendering the engagement recesses 1, 4 immovable. Now, the operation panel B is completely installed in the audio equipment body A.

Next, when the arm 6 is disengaged from the stopper, the torsion spring 7 causes the arm 6 to rotate to the position shown. Now the operator moves the operation panel B in the direction of arrow X to remove the operation panel B from the audio equipment body A.

In such a panel detaching apparatus for audio equipment, when the two positions are compared, i.e., an installed position in which the operation panel B is mounted in the audio equipment body A and a pop-up position shown in the figure in which the operation panel B is pushed out of the audio equipment, the angle between the claw piece 9 and the arm 6 is greater in the latter position, which means the resisting force of the torsion spring 10 is larger in the pop-up position.

Thus, the force required to move the operation panel B in the direction of arrow X is larger than the one required for the claw portion 9a to hold the engagement recess 4, making the detaching operation difficult.

SUMMARY OF THE INVENTION

The present invention has been accomplished to overcome the above-mentioned drawback experienced with the conventional panel detaching apparatus for audio equipment. The primary object of the invention is to provide a panel detaching apparatus, which makes the force required by the operation panel to displace the engagement claw during the process of panel detaching at least not greater than the force required for the engagement claw to hold the operation panel, thereby permitting easy detaching of the operation panel.

To achieve the above objective, the panel detaching apparatus for audio equipment comprises: a first arm rotatably mounted on the audio equipment body and urged in such a direction as to push the operation panel out of the audio equipment body; a holder supported on the first arm; an engagement claw pivotally mounted on the holder and urged to engage with the operation panel; and a second arm pivotally connected to the holder to restrict the operating direction of the engagement claw and its angle relative to the holder.

DETAILED DESCRIPTION OF PREFERRED EMBODIMENT

Figure 1:
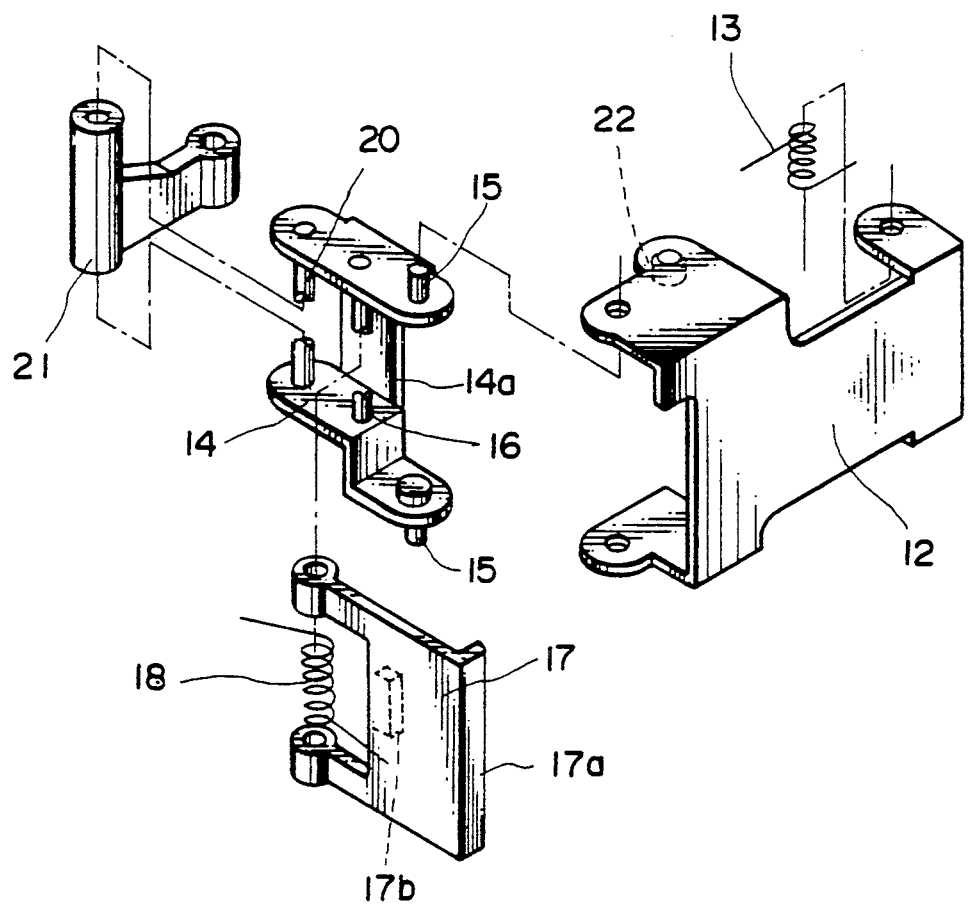
FIG. 1 is a perspective exploded view of an essential portion of a panel detaching apparatus as one embodiment of this invention.
Figure 3:
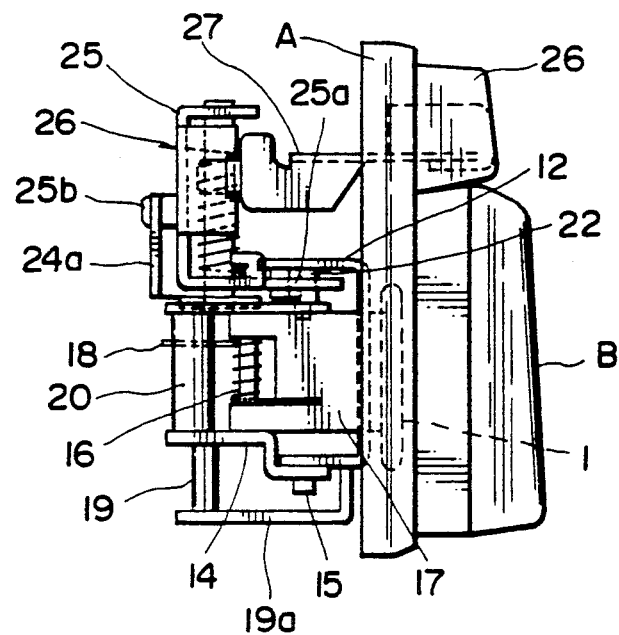
FIG. 3 is a side view of FIG. 2.
Figure 2:
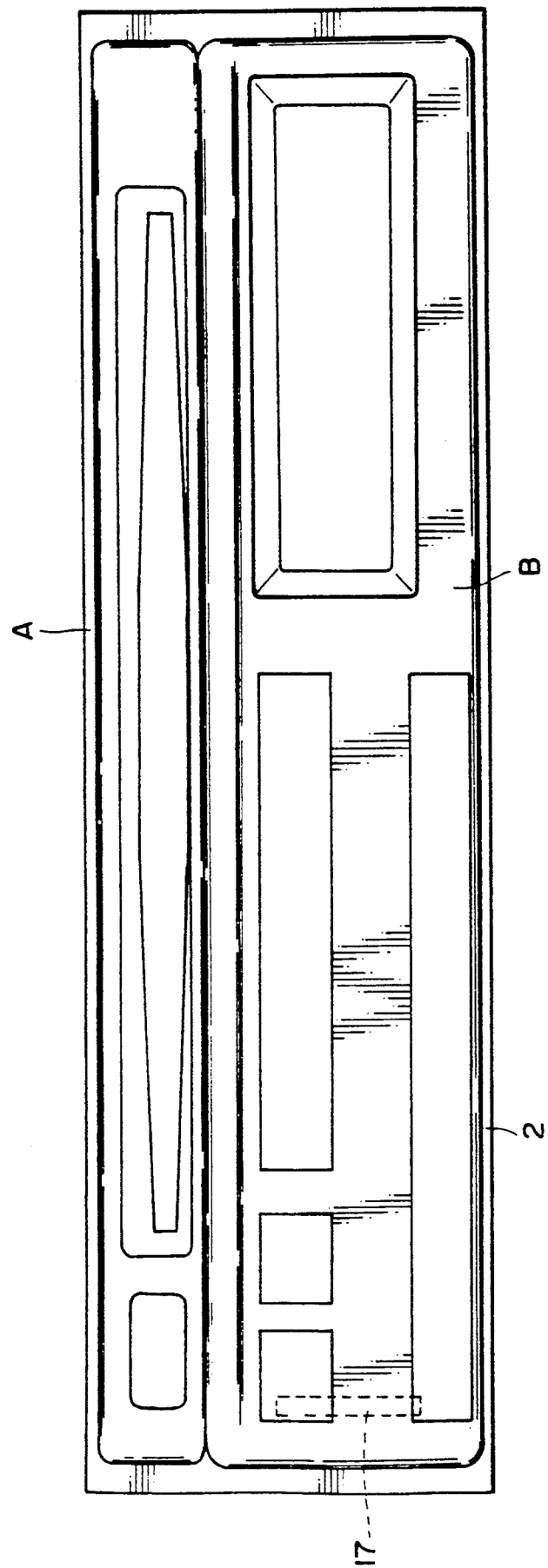
FIG. 2 is an overall front view of the apparatus of the invention.

Now, one embodiment of this invention will be described by referring to FIGS. 1 through 7.

In FIGS. 2 to 5, reference symbol A represents an audio equipment body, and B an operation panel. At the front of the audio equipment body A is formed a hollow portion 2 that accommodates the operation panel B. On one side of the hollow portion 2 is formed an inwardly projecting strip 3 that is adapted to fit into an engagement recess 1 of the operation panel B.

The hollow portion 2 in the audio equipment body A has a width virtually equal to that of the operation panel B so that the operation panel B, when installed, is prevented from moving sideways, as in the conventional apparatus.

In the audio equipment body A at the back of the hollow portion 2, a shaft 11 is provided on which a first arm 12 is rotatably mounted. The first arm 12 is urged toward the hollow portion 2 by torsion spring 13 wound on the shaft 11.

The first arm 12 has a holder 14 mounted thereon through a shaft 15. The holder 14 also has a shaft 16 on which is rotatably supported an engagement claw 17 that has a claw portion 17a to fit into the engagement recess 4 of the operation panel B.

Wound on the shaft 16 is a torsion spring 18 whose ends are engaged with a holder 14 and the engagement claw 17 to urge the claw portion 17a of the engagement claw 17 to fit in the engagement recess 4. Excess rotation of the engagement piece 17 by the force of the torsion spring 18 is prevented by an abut piece 17b of the engagement piece 17 abutting against a bent portion 14a.

On the back of the hollow portion 2, a shaft 19 is secured to a support piece 19a at a position farther away from the hollow portion 2 than the shaft 11 and close to the end of the first arm 12. The shaft 19 and a shaft 20 of the holder 14 are connected together by a second arm 21.

The first arm 12 has a stopper pin 22 erected thereon, and at the back of the hollow portion 2 a support plate 24 having a vertically disposed shaft 23 is mounted.

On the shaft 23 of the support plate 24 is supported a rotating plate 25 that has an engagement notch 25a to engage with the stopper pin 22. A torsion spring 26 wound on the shaft 23 and engaged with the support plate 24 urges the rotating plate 25 in a direction that causes the engagement notch 25a to engage with the stopper 22.

The rotating plate 25 is connected with a link plate 28 that is mounted on a pushbutton 27, which projects from the front surface of the audio equipment body A. When the pushbutton 27 is depressed, the rotating plate 25 is rotated against the force of the torsion spring 26, disengaging its engagement notch 25a from the stopper pin 22.

When the pushbutton 27 is stopped being pressed and then released, the rotating plate 25 is rotated by the torsion spring 26 until the its engagement portion 25b comes into contact with a stopper arm 24a of the support plate 24. The rotating plate 25, while rotating, pushes back the pushbutton 27 and then stops.

Next, the procedure for removing the operation panel B of FIG. 4 from the audio equipment body A will be explained.

First, when the pushbutton 27 is pressed, the rotating plate 25 is rotated releasing the stopper pin 22 from the engagement notch 25a, with the result that the first arm 12 is rotated by the torsion spring 13 in a direction that pushes the operation panel B out of the equipment body A.

Figure 4:
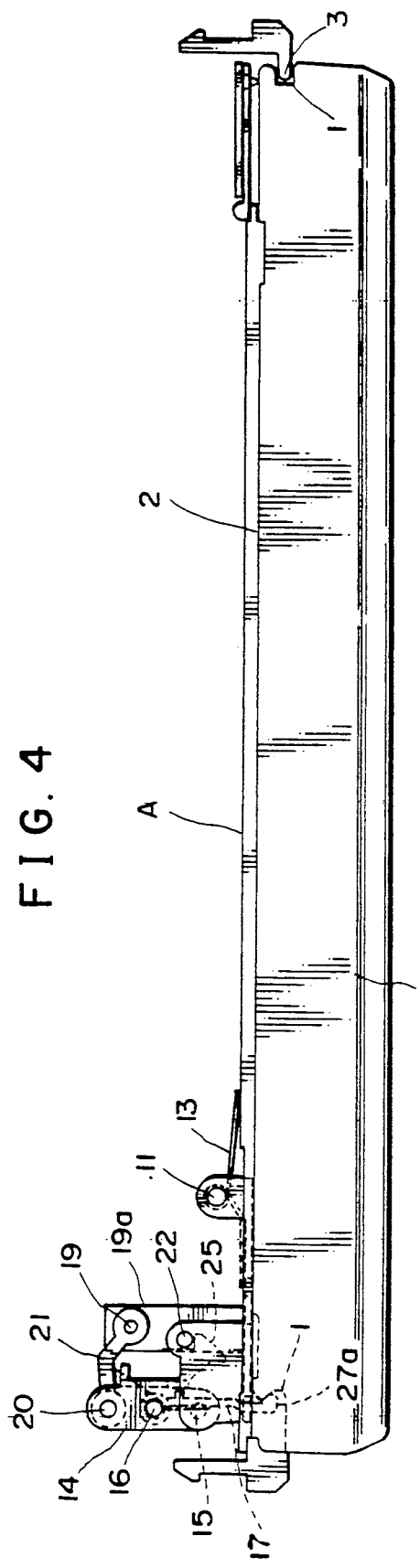
FIG. 4 is a plan view of the operation panel in a mounted condition.

Then, the holder 14 which is connected to the first arm 12 through the shaft 15 moves downwardly in FIG. 4, together with the engagement claw 17 that is mounted on the holder 14 through the shaft 16.

Since the shaft 20 of the holder 14 is connected with the second arm 21, the shaft 20 moves along the locus of the second arm 21. The locus of the shaft 20 is represented by an arrow D of FIG. 7, the locus of the shaft 15 by an arrow E, and the locus of the shaft 16 by an arrow F.

As mentioned above, the operation panel B is pushed downwardly in FIG. 4 by the rotation of the first arm 12, so that the panel B rotates about an engagement point between the engagement recess 1 and the projected strip 3.

At this time, since the claw portion 17a of the engagement claw 17 is engaged in the engagement recess 4 of the operation panel B, it moves describing a locus of an arc about the engagement point of the recess 1, which is approximate to a straight line perpendicular to the front surface of the audio equipment body A.

On the other hand, the holder 14 moves as a line connecting the loci indicated by arrows D and E, while the engagement claw 17 moves as a line connecting the locus indicated by arrow F and the locus of the claw portion 17a.

Figure 7:
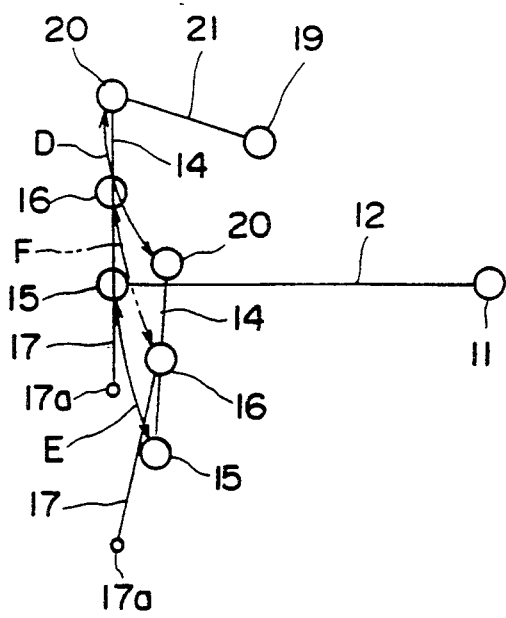
FIG. 7 is a diagram showing the loci of essential portions.

As a result, as shown in FIG. 7, the angle between the holder 14 and the engagement claw 17 at the end of the detaching motion is not so different from that at the beginning of the motion. That is, the force of the torsion spring 18 acting on the engagement claw 17 does not change greatly.

Figure 5:
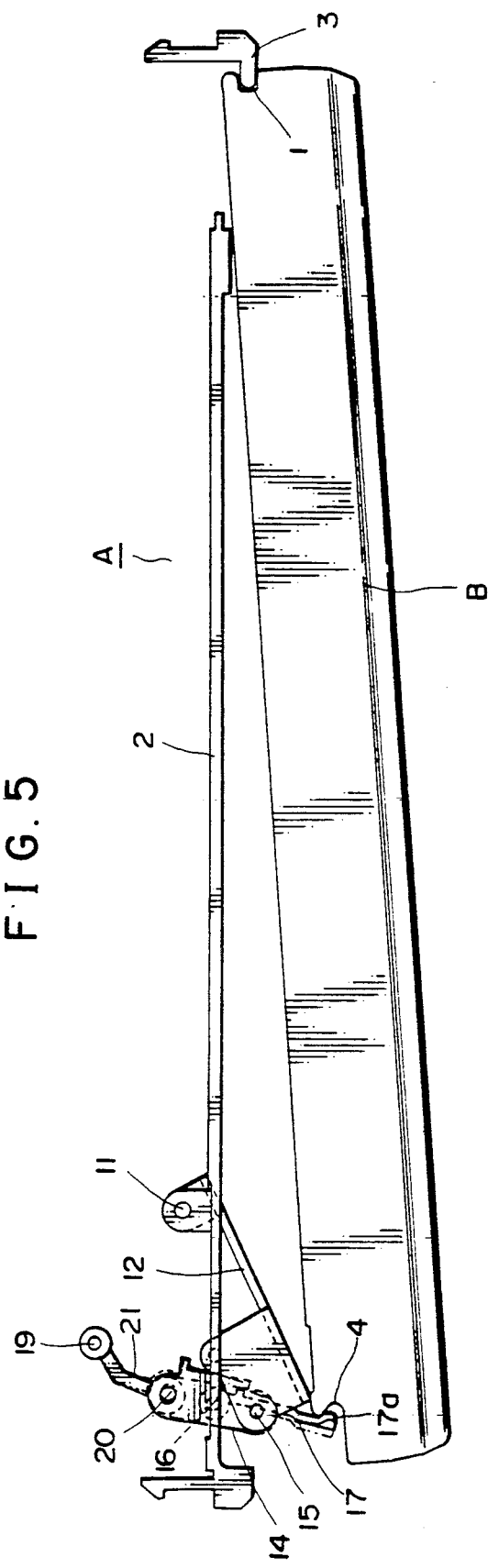
FIG. 5 is a plan view of the operation panel in a pushed-out condition.
Figure 6:
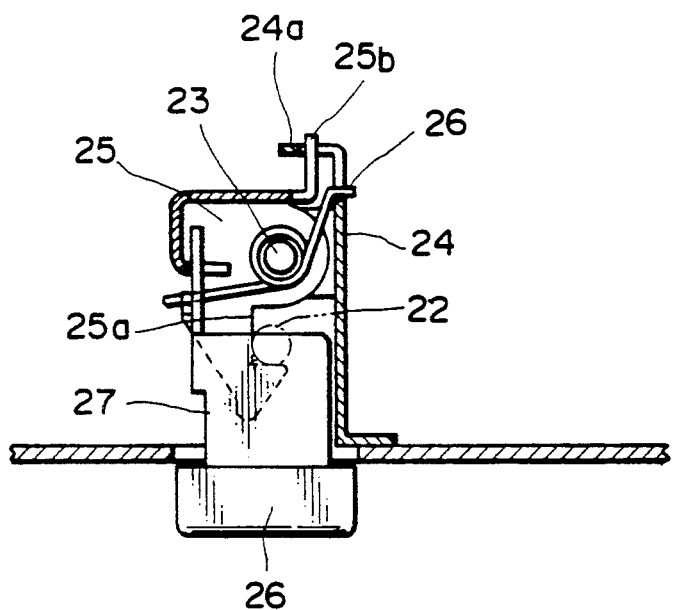
FIG. 6 is a cross section of an engagement portion of a first arm.

Now that the operation panel B assumes the position of FIG. 5, it is possible to push the operation panel B toward the left to disengage the engagement recess 1 and the projected strip 3 and remove the operation panel B from the audio equipment body A.

Mounting the operation panel B into the player body A to the condition of FIG. 4 can be done by reversing the above procedure.

In the mounted condition of FIG. 4, the operation panel B is fitted in the hollow portion 2 of the audio equipment body A and thus cannot be moved to the left. That is, it cannot be removed unless the pushbutton 27 is pushed to shift it to the position shown in FIG. 5.

Figure 8:
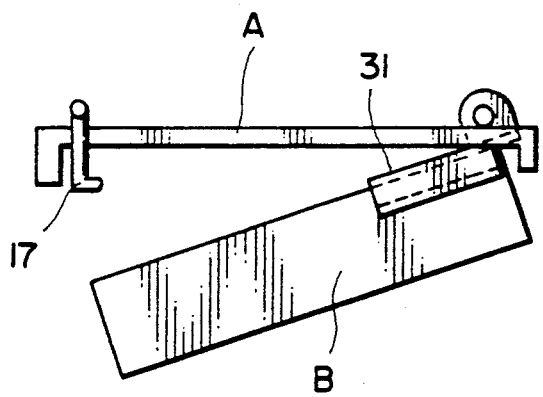
FIG. 8 is a plan view of another embodiment.
Figure 9:
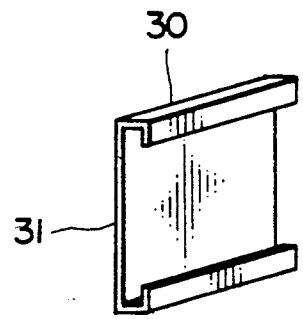
FIG. 9 is a perspective view of a support member.
Figure 10:
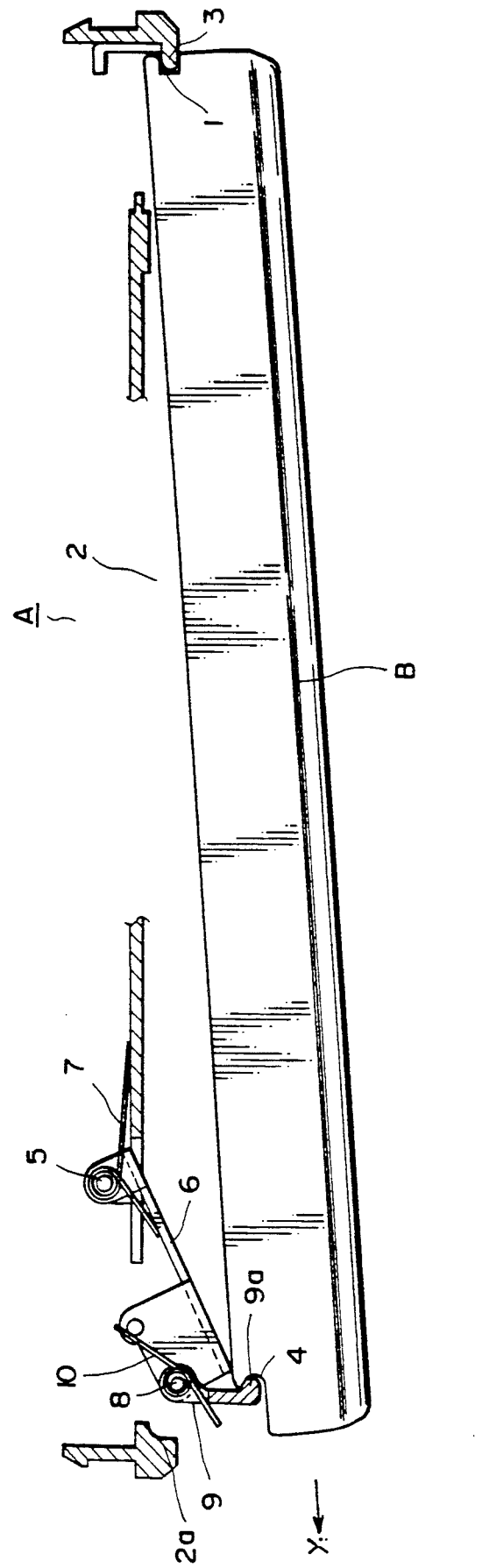
FIG. 10 is a plan view of a conventional apparatus.

FIG. 8 shows another embodiment of this invention.

Rather than using the engagement between the engagement recess 1 and the projected strip 3, this embodiment has rotatably mounted on the audio equipment body A a support member 31 which has a groove 30 on the upper and lower side thereof. The operation panel B is fitted into the support member 31, which is then rotated to be installed into the audio equipment body A.

In each of the above embodiments, it is possible to insert a pin into the first arm 12 or the holder 14 to stop the first arm 12 being rotated by the torsion spring when the operation panel B is mounted.

The advantage of this invention may be summarized as follows.

The holder that has an engagement claw for holding the operation panel is rotatably attached to the end of the first arm through a pin and is also pivotably connected to the second arm that is rotatably mounted on a fixed shaft. The action of the second arm keeps small a change in the angle between the holder and the engagement claw when the operation panel is displaced from the installed position to the pop-up position. This means that the force of the spring, installed between the engagement claw and the holder, does not change greatly, i.e., the force with which the engagement claw holds the end of the operation panel does not increase greatly but remains nearly the same as when the panel is installed in the audio equipment. Therefore, in the pop-up position the operation panel can easily be pushed toward the engagement claw and detached. In this way, the detaching and attaching the operation panel can be done with ease.

What is claimed is:

1. In a panel detaching apparatus for car-mounted audio equipment, in which an operation panel with operation buttons can be removed from or installed into a car-mounted audio equipment body such as disc player, cassette tape player and tuner, said panel detaching apparatus comprising:

a holder having an engagement claw for holding one side of the operation panel, said holder also having between it and the engagement claw a spring member for urging the engagement claw in such a direction as to engage with the operation panel;

a first arm for supporting said holder, said first arm having a spring member for urging the operation panel to move out of the audio equipment body; and a second arm connected to the holder so that a change in the angle between the engagement claw and the holder will be small when the engaged portion between the engagement claw and the operation panel moves virtually perpendicular to the front surface of the audio equipment body.

2. A panel detaching apparatus for car-mounted audio equipment as claimed in claim 1, wherein the other side of the operation panel opposite to the side where it is held by the engagement claw on the holder is fitted into and supported by a support member that is rotatably mounted on the audio equipment body.

* * * * *